Figure 1:
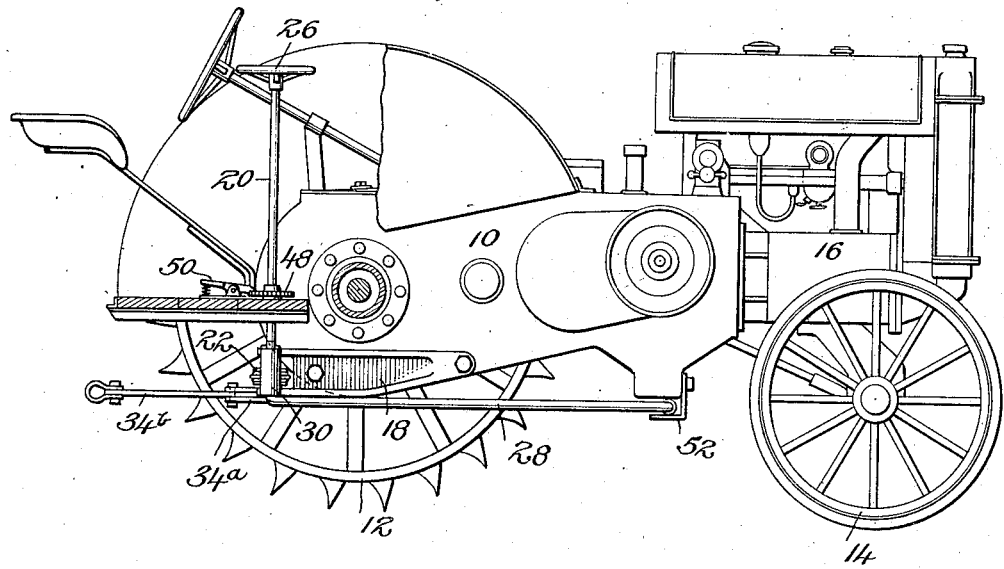

Nov. 12, 1929.　　　　P. P. BAKER　　　　1,735,719
DRAFT HITCH FOR TRACTORS
Filed Dec. 3, 1927　　　　2 Sheets-Sheet 1

Inventor
Philip P. Baker,
by Bright & Bailey
Attorneys

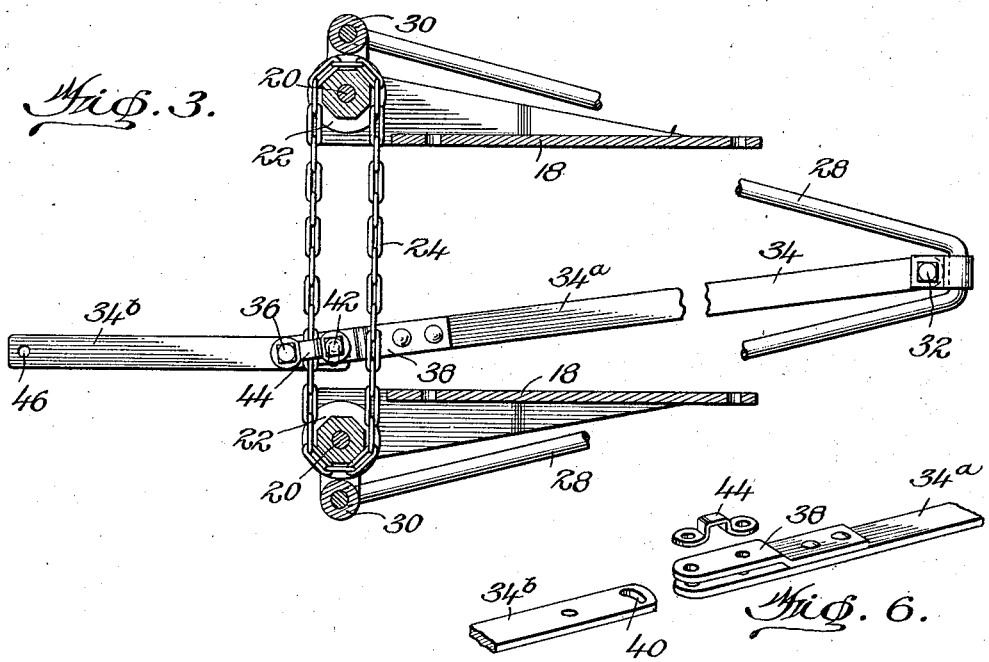
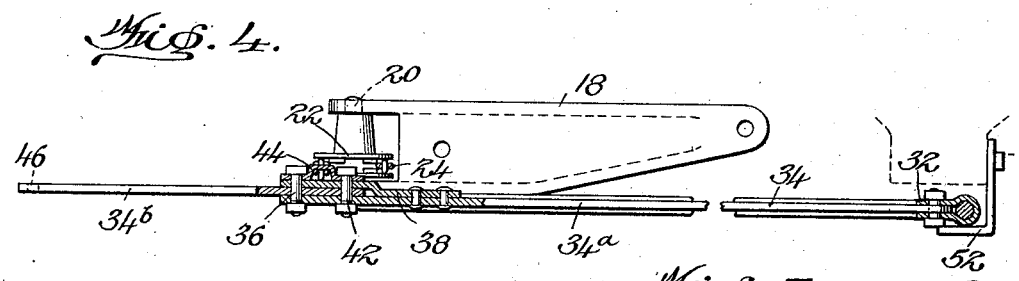
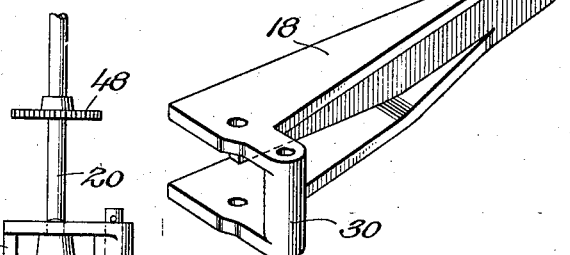
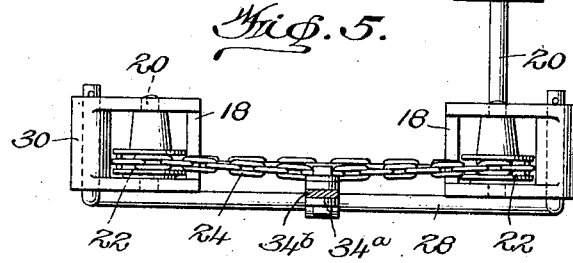

Patented Nov. 12, 1929

1,735,719

UNITED STATES PATENT OFFICE

PHILIP P. BAKER, OF CHULA VISTA, CALIFORNIA

DRAFT HITCH FOR TRACTORS

Application filed December 3, 1927. Serial No. 237,493.

My invention relates to draft hitches and has particular reference to a hitch of improved type for connecting agricultural machines and implements with tractors, my purpose, generally speaking, being to provide a hitch which eliminates tendency of a tractor, when pulling a heavy load, to turn over backwards, which permits the tractor to make short turns, and which provides for lateral adjustment of the line of draft with respect to the tractor to adapt an implement being pulled by the tractor for most efficient operation.

It is also my purpose to provide a hitch having the aforementioned advantages which is of simple construction, relatively cheap and easy to produce, strong and durable, capable of attachment to various types of tractors and which is thoroughly reliable and efficient in use.

With the foregoing and other purposes in view, my invention consists in the novel features of construction, combination and arrangement of parts as will be hereinafter more fully described, illustrated in the accompanying drawings and defined in the appended claims.

Figure 2:
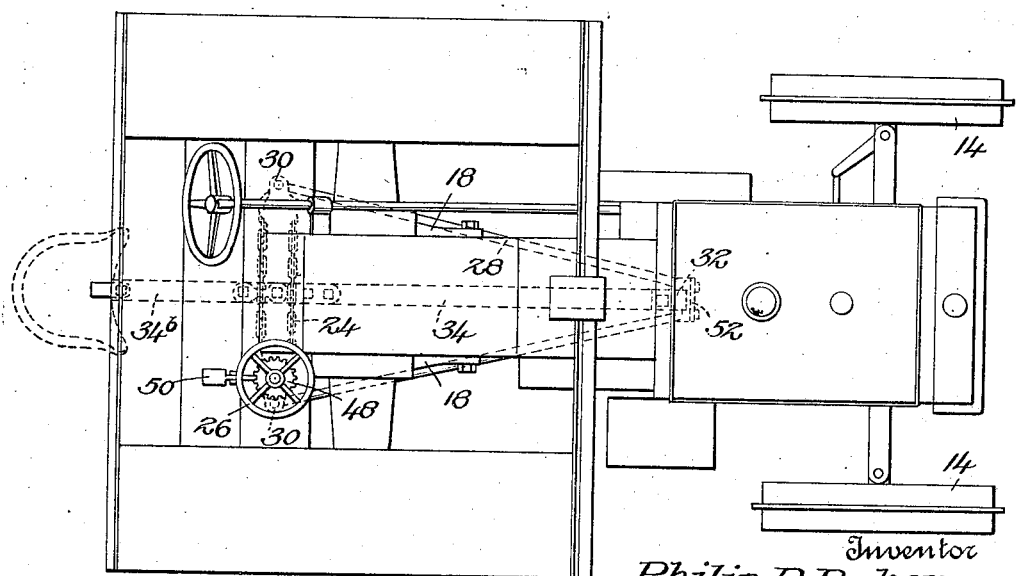

In the drawings, wherein like characters of reference denote corresponding parts in the different views:

Fig. 1 is a side elevation of a tractor showing my improved draft hitch operatively attached thereto;

Fig. 2, a top plan view of what is shown in Fig. 1;

Fig. 3, an enlarged top plan view of my improved hitch;

Fig. 4, a central longitudinal section through my improved hitch;

Fig. 5, a rear elevation of my improved hitch;

Fig. 6, a perspective view showing the manner in which the two parts of the draft bar of my improved hitch are connected together for relative pivotal movement; and Fig. 7, a perspective view of one of the attaching brackets of my improved hitch.

In Figures 1 and 2 of the drawings I have illustrated my improved draft hitch attached to a tractor of representative commercial type, same including, as usual, a frame or body 10 supported by rear traction wheels 12 and front steering wheels 14, the frame or body 10 consisting of a casing or housing within which is disposed the gearing, not shown, establishing a driving connection between the motor 16 and the traction wheels 12.

My improved draft hitch, best shown in Figures 3 to 5, includes essentially a pair of brackets 18, 18 adapted to be bolted or otherwise rigidly secured, respectively, against opposite sides of the housing 10 with their rear end portions extending sufficiently far beyond the rear end of said housing to permit a connection to be made between them. Said brackets are of duplicate right and left hand construction and each of them includes spaced, upper and lower bearing portions in which are journaled vertical shafts 20, 20, respectively, on which are mounted sprocket wheels 22, 22, respectively, having trained therearound an endless chain 24, one of said shafts extending upward from its related bracket a suitable distance and being equipped at its upper end with a hand wheel 26 whereby it may be rotated to cause the chain 24 to travel around the sprocket wheels 22.

A yoke 28 of V-shape as viewed in top plan, formed from a length of rod or other suitable material, has its free end portions secured in any suitable manner to lugs or bosses 30, 30 formed on the brackets 18, 18, respectively, and extends any suitable distance forwardly of said brackets, its forward end or bight portion having pivotally connected therewith in any siutable manner, as at 32, the forward end of a draft bar 34 which is swingable laterally at its rear end between the brackets 18, 18.

The draft bar 34 is composed of two sections 34ª, 34ᵇ, the forward section 34ª being of a length to extend from the forward end of the yoke 28 to the chain 24 and the rear section being of any suitable length and extending rearwardly from said chain. The forward end of the rear section is pivoted in any suitable manner as at 36 to the rear end of the forward section for lateral swinging movement with respect to said forward section, and the rear end of the forward section is connected in any suitable manner with one of the reaches of the chain 24, so that the rear end of the forward section is movable laterally between the brackets 18, 18 by rotation of the hand wheel 26. Specifically, the manner in which the draft bar sections are pivotally connected together and fastened to the chain 24 is as follows: To the rear end of the forward section 34$^a$ is secured a plate 38 the rear end portion of which is disposed in spaced relation to the upper face of said section. Between the plate 38 and the section 34$^a$ is arranged the forward end portion of the rear section 34$^b$, the pivot bolt 36 being passed through alined openings in the plate 38 and section 34$^a$ and through an opening in the section 34$^b$ located a short distance from its forward end. In the forward end of the rear section 34$^b$ is formed an arcuate slot 40 struck from the pivot 36 as a center, and through said slot and the parts 34$^a$, 38 is passed a bolt 42, it thus being apparent that the rear section 34$^b$ is pivotally connected by the bolt 36 to the forward section 34$^a$ for lateral swinging movement and that such swinging movement is limited by the length of the slot 40. A clip 44 overlying a link of the rear reach of the chain 24 is fastened to the draft bar by the bolts 36, 42. Thus it is apparent that by rotating the hand wheel 26 to cause the chain 24 to traverse the sprocket wheels 22, 22, the rear end of the forward draft bar section 34$^a$ may be moved to any desired laterally adjusted position between the brackets 18, 18 and that in any laterally adjusted position of the forward section the rear section 34$^b$ may pivot with respect thereto, so as to extend in the direction of the longitudinal axis of the tractor. In the rear end of the section 34$^b$ is formed an opening 46 to receive a shackle or other means whereby any desired implement may be attached to the draft bar.

On the shaft 20 which carries the hand wheel 26 is fixed a toothed wheel 48 with which cooperates a pivoted dog 50 mounted in any suitable manner for convenient foot actuation by the operator of the tractor. A spring normally maintains said dog in engagement with said wheel to lock the draft bar in any adjusted position in which it may be placed, release of said dog to permit adjustment of the draft bar being effected simply by depressing one end of said dog to disengage its other end from said wheel.

The forward end of the yoke 28 is supported by a plate 52 secured to a part of the tractor whereby said yoke is prevented from sagging or being bent downward at its forward end under the influence of loads imposed thereon through the draft bar 34.

In view of the foregoing it is manifest that due to the yoke 28 and draft bar 34 being extended well forwardly of the rear wheels of the tractor, any pull exerted by the tractor through said draft bar and yoke will tend to hold its forward end to the ground and thus prevent the tractor from turning over backwards, while at the same time the provision for lateral movement of the draft bar not only permits the tractor with an attached implement to make relatively short turns, but also provides for so locating the line of draft with respect to the tractor as to adapt an implement being pulled by the tractor for most efficient operation, it being manifest in this connection that bolt 42 provides means for securing the rear draft bar section 34$^b$ in any permissible position of angular adjustment with respect to the forward draft bar section 34$^a$.

While in the foregoing description and in the attached drawings I have disclosed one preferred embodiment of my invention, it is to be understood that various changes and desirable additions may be made in and to the structure shown within the spirit and scope of my invention as defined in the appended claims.

I claim:

1. In a draft hitch for tractors, a draft bar composed of a forward section and a rear section, means for pivotally connecting said forward section at its forward end with a tractor whereby said forward section is swingable about said pivot in a horizontal plane to dispose its rear end in different positions of adjustment transversely of the tractor, means for locking said forward section in different positions of pivotal adjustment thereof, a pivotal connection between a forward portion of said rear section and a rear portion of said forward section, and means for securing said sections in different positions of pivotal adjustment with respect to one another.

2. In a draft hitch for tractors, a draft bar composed of a forward section and a rear section, means for pivotally connecting said forward section at its forward end with a tractor whereby said forward section is swingable about said pivot in a horizontal plane to dispose its rear end in different positions of adjustment transversely of the tractor, means for locking said forward section in different positions of pivotal adjustment thereof, a pivotal connection between a forward portion of said rear section and a rear portion of said forward section, one of said sections having an arcuate slot formed therein, and a securing bolt passing through said slot and through the other section.

3. In a draft hitch for tractors, a draft bar composed of a forward section and a rear section, means for pivotally connecting said forward section at its forward end with a tractor whereby said forward section is swingable about said pivot in a horizontal plane to dispose its rear end in different positions of adjustment transversely of the tractor, a bolt pivotally connecting a forward portion of said rear section with a rear portion of said forward section, one of said sections having an arcuate slot formed therein, a second bolt extending through said slot and through the other section, an endless chain for adjusting the rear end portion of said forward section transversely of the tractor, and a clip for securing said chain to said forward section, said clip being retained in chain securing relation to said forward section through the instrumentality of the aforesaid bolts.

In testimony whereof I hereunto affix my signature.

PHILIP P. BAKER.